F. E. IVES.
COLOR PHOTOGRAPHY.
APPLICATION FILED JULY 19, 1916.
1,261,542.
Patented Apr. 2, 1918.
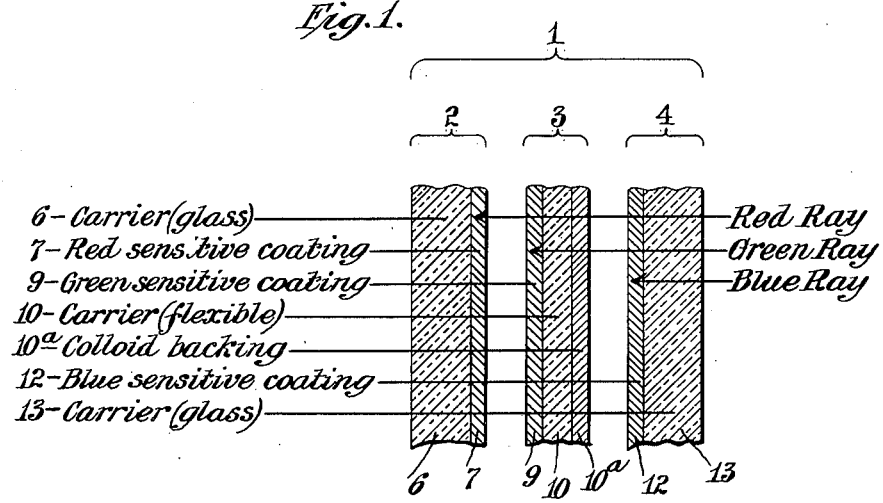
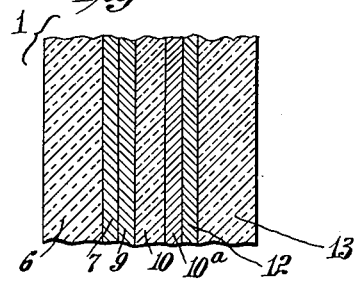
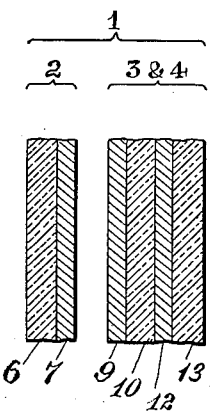
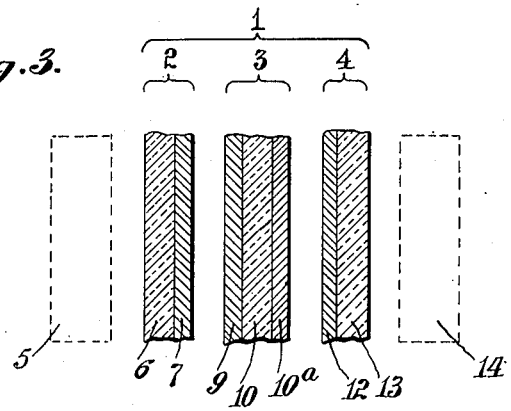
WITNESS
INVENTOR:
Frederic E. Ives
BY Rogers, Kennedy & Campbell,
his ATTORNEYS.

UNITED STATES PATENT OFFICE.

FREDERIC EUGENE IVES, OF PHILADELPHIA, PENNSYLVANIA.

COLOR PHOTOGRAPHY.

1,261,542.          Specification of Letters Patent.      Patented Apr. 2, 1918.

Application filed July 19, 1916. Serial No. 110,041.

*To all whom it may concern:*

Be it known that I, FREDERIC E. IVES, a citizen of the United States, residing at Philadelphia, in the county of Philadelphia and State of Pennsylvania, have invented certain new and useful Improvements in Color Photography, of which the following is a specification, reference being had therein to the accompanying drawing.

My invention relates to the art of color photography, and more particularly to a novel color photography "plate-pack," that is, a prearranged set or group of sensitive plates or films, and to a method of preparing the same.

While the present improvement might be otherwise applicable, it is particularly intended for the three-color system, and it is more especially directed to the object of enabling photography in the three-color system to be practised with the ordinary camera or plate-holder. A suitably designed plate-pack, made on the principles of this invention, may be used in various ways in the plate-holder or camera; and by plate-pack I include any convenient set or group of plates or films adapted to the purposes hereof. When in proper place in the plate-holder or camera the pack may be exposed for the proper length of time, with or without the interposition of suitable color screens.

Examples of plate-packs for the trichromatic or three-color system of color photography are illustrated in my prior Patents Nos. 927,244 of July 6, 1909, and 1,173,429 of February 29, 1916. In said prior patents a member or layer sensitive to one color (green) is located between a front member or layer sensitive to another color (blue) and a rear member or layer sensitive to the third color (red), the several members with their supports being held snugly together in the form of a plate-pack. By this arrangement rays of light passing from the objective of the camera through the several transparent, sensitive, closely contacting layers form images upon all of them in a single exposure.

The details of the plate-packs described in my said prior patents may be ascertained from the patents. I will describe the plate-pack constituting the present invention and the method of making the same with particular reference to the features of improvement and novelty constituting the present invention.

The general object of the present invention having been above stated, particular objects may be referred to as consisting in improving the efficiency, accuracy, ease of building-up, compactness and ease of treatment after exposure. Other and more detail objects and advantages will be elucidated in the hereinafter following description or will be apparent to those skilled in the art.

To the attainment of the above referred to objects, the present invention consists in the novel color-photography plate-pack hereinafter described and illustrated, and the novel components thereof, and the method of making the same.

In the accompanying drawings forming a part hereof, Figure 1 is a sectional view of a number of components shown in their proper order to constitute a plate-pack according to this invention, but slightly separated and much exaggerated to render the illustration and description more lucid.

Fig. 2 shows the components of Fig. 1 brought together into compact operative relation.

Figs. 3 and 4 show modifications.

The plate-pack designated as a whole as 1 is shown as consisting of a plurality of members, including the sensitive members 2, 3 and 4 respectively. The member 2 is red-sensitive, the member 3 green-sensitive and the member 4 blue-sensitive in the preferred embodiment of the invention, but, as changes in actual colors are possible, these may conveniently be referred to as the rear color, the middle color and the front color.

Although one or more, or all, of the members 2, 3 and 4 may be flexible rather than rigid, the plate-pack as a whole should be rigid to maintain it in a flat plane during exposure. Therefore, at least at the rear and front should be rigid members or plates which could be held together under clamping pressure.

For safety and exclusion of light the rear of the plate-pack should be opaque or coated to exclude admission of light, whereas the front of the pack and the intermediate layers must be transparent to permit the penetration of rays to the rearmost sensitive member.

The red-sensitive member 2 preferably comprises a transparent carrier 6, which may be of glass and rigid, as in Figs. 1 and 2, or of celluloid and flexible, as in Figs. 3 and 4, in which latter case a separate opaque pad or plate 5 may be applied at the rear for clamping purposes. Facing forwardly or at the front surface of the carrier 6 is the red-sensitive coating 7. It will be understood that this is a specially sensitized layer, and, although not insensitive to blue and green light, no blue light can reach it through the two forward components to be described, while so little green can reach it, as to be practically negligible; or a red surface stain applied on or in front of the layer 7 will completely exclude undesirable light.

Referring next to the green-sensitive member 3, this comprises at the rear side the green-sensitive coating 9, formed on a preferably flexible celluloid carrier 10. At the front of this celluloid carrier is indicated a colloid layer or backing 10$^a$, the purpose of which will now be explained.

The intermediate celluloid layer 10 is preferably of extreme thinness, so as to occupy as little space as possible in the plate-pack and avoid separating the contacting red and green sensitive layers from the blue-sensitive layer any more than necessary. It has been found that when the green-sensitive emulsion has been applied to one side of thin celluloid, the uncovered side, by reason of the volatilization of one or more of its constituents, shrinks somewhat, although slowly, and, when kept in packages, shrinks fastest at the exposed edges, thus buckling the film and making it unsuitable for this purpose. Moreover, if such shrinkage occurs after the film is exposed and converted into a negative, such shrinkage, even if not uneven, destroys the register of the images by making the green-light negative smaller than those on glass. This defect I have discovered may be eliminated by employing celluloid which has been coated, or is in adhering contact, with a gelatin film on both sides. Gelatin is practically impervious to the camphor or other volatile constituents of celluloid film, and thus is able to prevent the shrinking and buckling referred to.

Instead of coating the front surface of the carrier 10 with a special gelatin layer 10$^a$ as described, the same result may be obtained, as indicated in Fig. 4, by the adhering attachment of the celluloid to the colloid surface of the blue-sensitive member 4 at the front. This is readily effected by dipping the celluloid carrier 10 in amyl acetate and squeegeeing it to the face of the blue-sensitive member by first running it between elastic rolls and then holding it under pressure between flat surfaces for a few minutes. The members so attached may be readily stripped apart after exposure and before development, and any subsequent shrinking or buckling can be secured against by applying a gelatin coating to the finished negative.

Referring now to the front or blue-sensitive member 4, this consists of the blue-sensitive coating 12 at the rear side of the transparent carrier 13, which may be of glass or rigid, as seen in Figs. 1 and 2, or may be of celluloid or flexible, as in Figs. 3 and 4, in which latter case a separate rigid glass plate 14 may be applied at the front for flatly clamping the entire plate-pack during exposure.

Another feature of improvement is with respect to the blue-sensitive layer 12. In said prior patents this was a relatively fine-grained and very transparent layer, so as to reduce the actinic action and assist in securing the proper relative exposures for the three members, and to transmit the red and green rays freely and with minimum scattering and diffusion. With such a blue-sensitive layer it became necessary to prevent transmitted blue light from reaching the sensitive emulsions to the rear. For this purpose a superficial yellow color screen coating was applied to the rear of, and preferably directly upon, the blue-sensitive layer.

A defect, however, has been found in plate-packs made according to my prior patents. Owing to the great transparency of the blue-sensitive layer, consisting of silver salt contained in a colloid emulsion, the actinic effect of the light extended entirely through the depth of the layer to the rear surface in such way that, although the relative gradations were well enough preserved at each point on the plate, the density of the resulting negatives in the most exposed portions varied perceptibly. This was found to be due to variations of the thickness of the sensitive emulsion coating itself. It is practically impossible in the commercial manufacture of photographic dry plates to avoid some unevenness of coating due to the unavoidable variations in the trueness of the glass surface.

My improvement for overcoming this defect is to adopt a means to equalize the action of the light over all portions of the plate. This I have succeeded in accomplishing by incorporating in the blue-sensitive layer an amount of soluble dye of non-actinic color sufficient to limit the effective penetration of the blue light, so as to confine its action practically to the underneath or forward portion of the sensitive layer or to such thickness thereof as is represented by the thinnest parts of the variable coating.

A yellow dye such as tartrazine is entirely suitable for this purpose. Its incorporation in the emulsion or in the sensitive layer effects the retardation of light for the purposes referred to.

Furthermore, it will be observed that this yellow coloring matter will serve not only to thus equalize the action of light in an unevenly coated film, but also as a color screen to exclude the blue rays from the green and red-sensitive members behind. It thus serves different functions including that of the superficial yellow layer employed in said prior patents.

Another advantage or function of this part of my improvement is that it permits the effective speed of a blue-sensitive plate to be reduced quantitatively, which is highly desirable to place it on equality with the other plates; and gives correction, as well, of the characteristic tendency of such slow plates to relatively excessive contrast and density.

The non-actinic dye, acting as a restrainer, thus insures reduction in density and contrast as well as equalization of action, and control of speed, and, in practice, these functions and benefits coördinate so that no one is gained at the sacrifice of any other function.

Furthermore, this improvement permits the usual yellow compensating screen to be omitted from the camera. This was employed to equalize the action of the light on the three sensitive members. The reduction by the light restrainer in the blue-sensitive member effects this function.

This improvement, therefore, perfects the action of the film packs of the prior patents in several ways. The characteristics of the blue-sensitive members are rendered such as to be in close agreement with those of the other sensitive members of the plate-pack. The use of a color which, like tartrazine, cuts off the blue-violet spectrum rays, to which the fine-grained blue-sensitive plates are alone responsive, without any reduction of the green or red light transmission, substantially equalizes any possible inequalities of opacity due to varying thicknesses of the blue-sensitive coating. The coördination of all the factors mentioned by the simple improvement recited is remarkably successful in practice.

The green-sensitive member may be somewhat improved by incorporating yellow tartrazine dye, and the red-sensitive member may be similarly improved by incorporating a yellow rhodamine dye in the emulsion; these improvements giving complete assurance that each sensitive member will record exclusively the action of its appropriate group of spectrum rays.

It will be seen that according to this invention all three of the sensitive members may be flexible, because including celluloid carriers. By this arrangement the further advantage is attained that two or more of the members, for example, the red-sensitive member 2 and the green-sensitive member 3, may be produced from the same batch, and may therefore be of corresponding qualities. Thus, a batch of green-sensitive members may be constructed from a given emulsion and a portion of them converted to red-sensitiveness in accordance with said prior Patent 1,173,429. This insures the same density and gradation factors for both of these members. Moreover, the greater flexibility and evenness of the celluloid film, as compared with glass plates, would give a greater assurance of perfectly even contact. An elastic pad 5 at the rear as a clamping member opposed to the transparent glass at the front enhances intimate contact.

It will thus be seen that I have described a plate-pack, and indicated the process of making the same, which accomplishes the objects and advantages hereinbefore recited, and other advantages will be apparent to those skilled in the art. Since various features and details hereof may be altered without departure from the invention hereof, I do not wish to be limited thereto except as set forth in the claims.

What is claimed is:

1. A film pack for color photography comprising a red-sensitive member at the rear of and facing a blue-sensitive member, with an interposed green-sensitive member facing the red-sensitive member, said blue-sensitive member having its sensitive coating colored throughout its thickness with a yellow dye.

2. A plate-pack or plate set for color photography comprising a plurality of differently color-sensitized photographic members secured together for simultaneous exposure, the foremost thereof having incorporated in its sensitized layer a non-actinic soluble color.

3. A plate pack or plate set for color photography comprising a plurality of differently color-sensitized photographic members secured together for simultaneous exposure, the blue-sensitive member of said plate-pack having a temporary yellow dye incorporated in its sensitive layer, whereby to restrain and equalize the light action therein and to serve as a color screen for the member or members to the rear.

4. A film pack for color photography comprising a carrier having a red-sensitive coating facing a blue-sensitive colloid coating on another carrier, with an interposed celluloid carrier having a green-sensitive coating facing said red-sensitive coating, the back of said celluloid carrier adhering to said blue-sensitive coating.

5. A plate-pack or plate set for color photography comprising a plurality of differently color-sensitized photographic members secured together for simultaneous exposure, each of said members consisting of a flexible celluloid carrier having a sensitized layer on one side and one of said members at its other side being held in adhering contact with the sensitized colloid face of another member, but adapted to be detached for development after exposure.

6. A film pack for color photography comprising a carrier having a red-sensitive coating at the rear of and facing a blue-sensitive coating on another carrier, with an interposed celluloid carrier having a green-sensitive coating facing said red-sensitive coating, said blue-sensitive coating being colored throughout its thickness with a yellow die, and the back of said celluloid carrier being in adhering contact with said blue-sensitive coating.

7. A film pack for color photography consisting of a plurality of differently color-sensitized members each comprising a carrier with a sensitive coating upon one side only, the members being so assembled that the foremost and rearmost have their sensitized surfaces facing each other, the sensitive coating of the foremost member having distributed throughout the thickness thereof matter having a temporary non-actinic color substantially opaque to light detrimental to one or more of the sensitized members behind the foremost.

8. The herein described method of making a color photography plate-pack, consisting in preparing a plurality of differently sensitized members, at least one of which consists of a celluloid carrier provided with a sensitive coating upon one side, treating the other side of such celluloid carrier with a softening agent such as amyl acetate and pressing the same thus softened into adhering contact with the sensitive coating of another of such members.

9. A film pack for color photography comprising a red-sensitive member at the rear of and facing a blue-sensitive member, with an interposed green-sensitive member facing the red-sensitive member, said blue-sensitive member having its coating colored throughout with a yellow dye, and said green-sensitive member comprising a transparent carrier bearing a colloid coating at its side facing the blue-sensitive member.

In testimony whereof, I have affixed my signature thereto.

FREDERIC EUGENE IVES.